June 1, 1954 J. C. HEINTZ 2,679,715
PREPARING A TIRE FOR RETREADING
Filed April 12, 1952 2 Sheets-Sheet 1
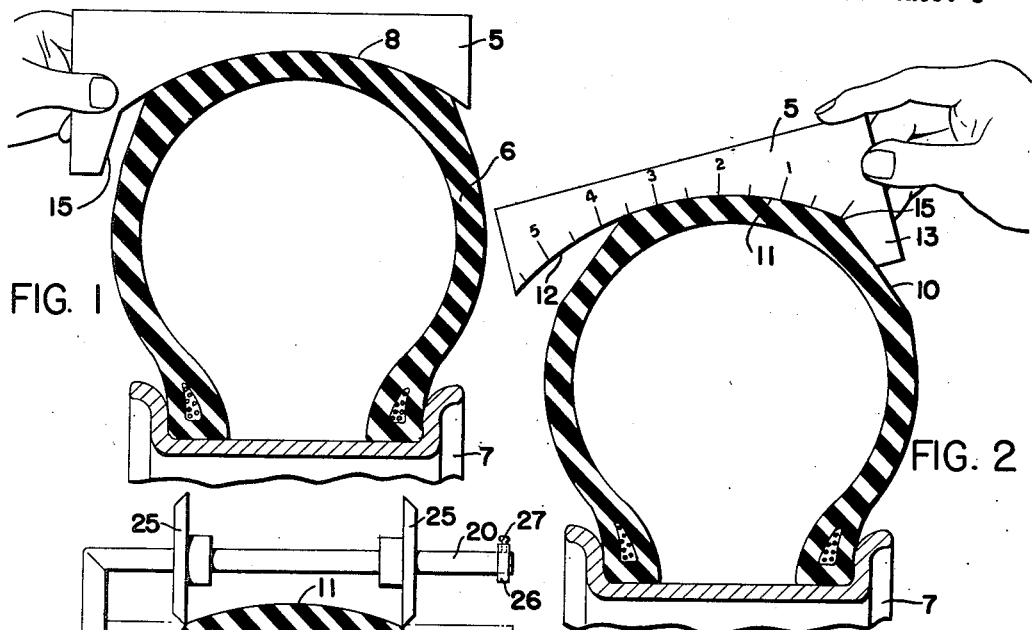
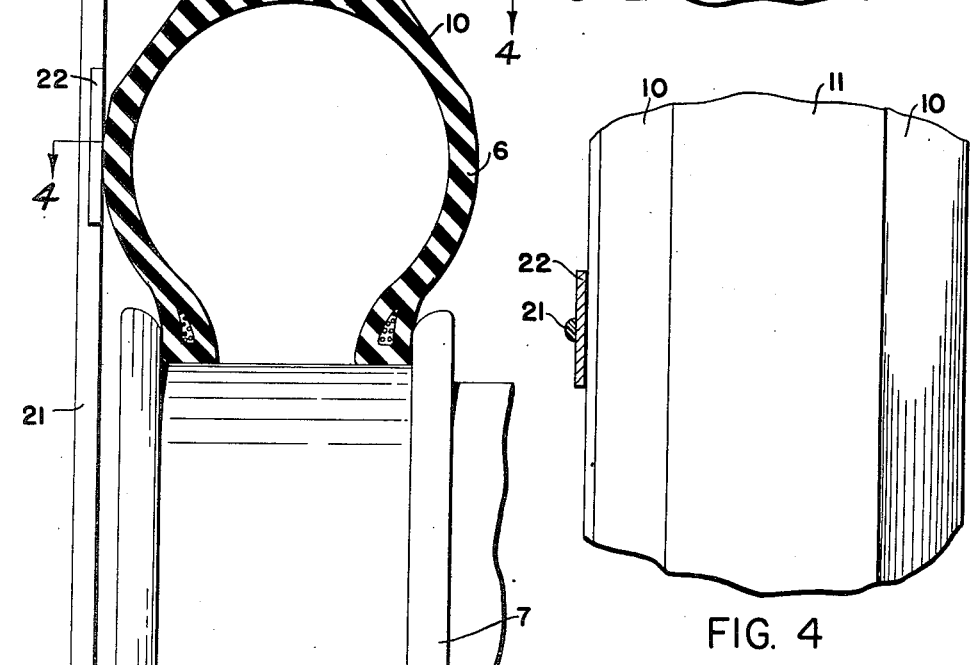
INVENTOR.
JAMES C. HEINTZ
BY
*Gordon C. Mack*
ATTORNEY June 1, 1954  
J. C. HEINTZ  
2,679,715  
PREPARING A TIRE FOR RETREADING  
Filed April 12, 1952  
2 Sheets-Sheet 2

FIG. 5

| 15" RIM TIRES | | 16" RIM TIRES | | CURED IN MATRIX AND SPACER NO. | | ARC THREAD WIDTH | TREAD RADIUS | STOCK SIZE TOP TREAD UNFINISHED SHOULDER | STOCK SIZE FINISHED SHOULDER | CURING TIME 45 LBS. STEAM (292°F) 100 LBS. PRES. IN AIR BAG | PERIPHERY OF MATRIX INCLUSION |
|---|---|---|---|---|---|---|---|---|---|---|---|
| MOUNT ON RIM WIDTH | BUFFED BEAD TO BEAD | MOUNT ON RIM WIDTH | BUFFED BEAD TO BEAD | | | | | | | | |
| 4.00 | 16⅛ | 4.00 | 15⅛ | 1277 | NO SP. | 4 | 9 | 40-44-12 | 36-62-12 | 60 MIN | 63¼ |
| 3.50 | 16⅜ | 3.50 | 15⅜ | | NO SP. | 4 | " | 40-44-12 | 36-62-12 | " | " |
| 4.75 | 17⅛ | 4.75 | 16⅛ | 1286 | NO SP. | 4⁵⁄₁₆ | 9½ | 42-46-12 | 40-64-12 | " | " |
| 4.00 | 17⅜ | 4.00 | 16⅜ | | NO SP. | 4⁵⁄₁₆ | " | 42-46-12 | 40-64-12 | " | " |
| 5.25 | 17⅝ | 5.25 | 16⅝ | 1292 | NO SP. | 4½ | 9¾ | 44-50-12 | 42-72-12 | 65 | 67⅝ |
| 4.75 | 17⅞ | 4.75 | 16⅞ | | NO SP. | 4½ | " | 44-50-12 | 42-72-12 | " | " |
| 5.25 | 18½ | 5.25 | 17½ | 1296 | ½ SP. | 4¹³⁄₁₆ | 9½ | 46-52-12 | 44-74-12 | 70 | 68⅝ |
| 4.75 | 18 | 4.75 | 17 | | NO SP. | 4⁵⁄₁₆ | " | 42-46-12 | 40-64-12 | " | " |
| 4.75 | 18¾ | 4.75 | 17¾ | | ½ SP. | 4¹³⁄₁₆ | " | 46-52-12 | 44-74-12 | " | " |
| 5.25 | 19¼ | 5.25 | 18¼ | 1306 | NO SP. | 4¾ | 10 | 46-52-14 | 44-74-14 | 75 | 70½ |
| 5.25 | 20 | 5.25 | 19 | | ½ SP. | 5¼ | " | 50-54-14 | 46-76-14 | " | 71½ |
| 4.75 | 19½ | 4.75 | 18½ | | NO SP. | 4¾ | " | 46-52-14 | 44-74-14 | " | " |
| 4.75 | 20¼ | 4.75 | 19¼ | | ½ SP. | 5¼ | " | 50-54-14 | 46-76-14 | " | " |

INVENTOR.  
JAMES C. HEINTZ  
BY  
ATTORNEY

Patented June 1, 1954

2,679,715

UNITED STATES PATENT OFFICE 2,679,715

PREPARING A TIRE FOR RETREADING

James C. Heintz, Lakewood, Ohio; The Cleveland Trust Company, executor of said James C. Heintz, deceased Application April 12, 1952, Serial No. 281,999

1 Claim. (Cl. 51—281)

This invention relates to the preparation of a tire for retreading a mold equipped with interchangeable matrices and spacers for producing mold cavities of different sizes and shapes.

In my application Serial No. 199,448 filed December 6, 1950, buffing the shoulders as well as the tread of a worn tire and adding new rubber to both is disclosed. According to the present invention the angle to which the shoulders are buffed and the width of the resulting tread are measured and controlled so that when new rubber of standard dimensions is applied to the tread and shoulders the tire can be cured in a selected mold cavity with little or no distortion. Properly fitting the tire to the mold cavity gives a balanced tire which is free from distortions and strains found in tires which are retreaded with less care.

My Patent 2,434,156 relates to the measured buffing of a tire to fit a selected mold cavity, but the buffed tread is rounded from one edge to the other, and the shoulders are not separately buffed.

Passenger tires of the so-called super-balloon or low-pressure type, are best suited to the practice of the present invention. It will be explained in connection with the accompanying drawings in which—

Fig. 1 illustrates the measurement and checking of the curvature of the buffed tread, showing a section through the tire;

Fig. 2 illustrates the measurement and checking of the angle at one of the shoulders, showing a section through the tire;

Fig. 3 illustrates checking the tread width and its location, showing a section through the tire;

Fig. 4 is a view on the line 4—4 of Fig. 3; and

Fig. 5 is a chart such as may be used in carrying out the invention.

A tire can be properly retreaded only if certain information is first obtained with regard to the dimensions of the mold cavities obtainable by the use of the available matrices and spacers in the mold which is to be used. The tire should be prepared for retreading in a certain mold cavity, although with a full line of matrices and spacers there may be some overlapping so that a tire may be retreaded in either of two mold cavities.

The chart of Fig. 5 gives information regarding the mold cavities provided by certain commercial equipment for retreading tires of the following standard sizes: 6.40–15, 6.70–15, 7.10–15, 7.60–15, 8.20–15, 6.70–16 and 7.60–16.

In the chart the first double-column is used in retreading tires with a 15-inch rim, and the second double-column for tires with a 16-inch rim. The first of each of these double-columns refers to the width of the rim the tire is to fit when retreaded, as shown by the chart. The bead-to-bead measurement (explained in U. S. 2,434,156) depends upon whether the beads are spread to fit a narrower or wider rim.

The first thing to do is to determine the molding cavity which is to be used. An experienced man can do this quickly by first making a bead-to-bead measurement of the tire and measuring the diameter of the worn tread. From such measurements, the proper molding cavity is selected by referring to the chart. The 1277 spacer is designed to be used in retreading 6.40–15 tires, the 1286 spacer for 6.70–15 tires, the 1292 spacer for 7.10–15 tires, the 1296 spacer for 7.60–15 and 6.70–16 tires, and the 1306 spacer for 8.20–15 and 7.60–16 tires. Tires are apt to grow in service, particularly if made from synthetic fabric, so the tire need not be retreaded in a mold equipped with the spacer designed for retreading tires of that particular size. The experienced man knows what matrix and spacer should be used in retreading any given tire.

Having selected the matrix and spacer to be used, the tire will be buffed to an exact tread radius and bead-to-bead measurement. The latter is determined as described in my said U. S. Patent 2,434,156. The bead radius is determined by use of a template 5 shown in Fig. 1. In order to use the chart of Fig. 5 the operator must be provided with a series of templates cut to radii of 9, 9½, 9¾ and 10 inches. Assume, for instance, it has been determined that the tire 6, which is designed for use on a 15 inch rim will have a final buffed bead-to-bead measurement of 18 inches. By referring to the chart it will be decided that it should be retreaded for use on a 4.75 inch rim. The eighth line of the chart shows that matrix 1296 will be used without a spacer. The chart requires that the tread be buffed to a radius of 9½ inches. The template of this radius will be selected. The buffing will be controlled to give a final tread that fits this template when the bead-to-bead measurement is 18 inches. Fig. 1 illustrates how the template 5 is used in making this determination. The tire 6 is mounted on the drum 7 of a buffer. The template is placed against the buffed tread 8. If the operator can see light between the tread and the template, the template does not fit and any high spot must be buffed away.

It will be observed that the shoulders have not been removed from the tire shown in Fig. 1. These are now buffed off as shown in Fig. 2 until the angle between the shoulder 10 and the tread 11 exactly coincides with that provided between the circular edge 12 and the edge of the extension 13 of the template 5. The buffed shoulder angles should be the same for all tires of a certain buffed tread radius, but different angles are recommended for different tread radii, and these different angles are incorporated in the different templates.

The edge 12 of the template is graduated in inches of arc width from the angle 15. The width of the tread is measured directly from the template. This width must be less than the arc tread width shown on the chart by twice the thickness of the camelback which is to be used. The chart shows both types of camelback (finished and unfinished stock sizes) used with this mold cavity are $12/32$ inch thick. Twice this is $3/4$ inch. Therefore, for the tire with a bead-to-bead measurement of 18 inches, the buffed arc tread width is not the arc tread width of $4\frac{5}{16}$ inches given on the chart, but $3/4$ inch less than this or $3\frac{9}{16}$ inches. When the buffed surface approaches the desired end measurements, the buffing is done a little at a time and carefully followed by testing with the template and tread-squaring tool. The use of the latter will now be described.

To obtain an altogether satisfactory new tread it is necessary that the tread be in the middle of the tire. Some retreads zigzag. This produces strains in the carcass of the tire, and the tread does not wear satisfactorily. The tread-squaring tool, shown in Figs. 3 and 4, is designed to test the location of the tread and determine whether it is of uniform width. This tool is formed of a solid rod bent at right angles to form the short arm 20 and long arm 21. The arm 21 extends downwardly and lies flat against the sidewall of the tire below the drum 7. The plate 22 is inset in the rod to lie flat against the surface where it contacts the sidewall of the tire above the drum. This plate assists in placing the arm 20 squarely across the tread. The wheels 25 are slidable on the arm 20 and also rotatable on it. The collar 26 fastened by set screw 27 keeps the wheels from sliding off the tool when it is not in use.

The arm 21 is held substantially vertical and flush against the sidewall of the tire both above and below the drum, and the arm 20 is held squarely across the tread of the tire. The wheels are brought to the angles where the shoulders join the tread. The drum is then rotated. If the wheels follow the edges of the tread throughout a complete revolution of the tire it is assumed that the tread is in the middle of the tire. If they do not both follow the respective edges of the tread, the tire is buffed to correct the irregularities, or if necessary raw rubber may be cemented to the buffed surface to fill out any low areas.

When the tire has been buffed to the desired tread radius and width, with the shoulders at the required angle, and the bead-to-bead measurement that is required by the chart, and it is certain that the tread is in the middle of the tire, the tire is ready for the application of the camelback. There are two types on the market that are recognized as standard at the present time. The chart refers to both under the heading "Stock Sizes" and shows that for the matrix for the tire measuring 18 inches bead-to-bead, the camelback with unfinished shoulders and known as 42-46-12 is to be used, or that with unfinished shoulders and known as 40-64-12 will be used. When either of these slabs is cemented in place and properly pressed to the buffed surface in the usual manner to remove all occluded air, and the tire is put in the mold with a 1296 matrix without any spacer, and cured for 70 minutes at 100 pounds' pressure (see chart) the tire will be most satisfactorily retreaded. If preferred, the new rubber used may be camelback applied to the tread and separate strips (which may be of different composition from the camelback) applied to the shoulders as described in my application Serial No. 199,448 filed December 6, 1950. The foregoing instructions may be followed if such rubber occupies the same volume as the standard stock of a required size to which the chart refers.

With proper buffing equipment the tire may be buffed to a predetermined bead-to-bead measurement by buffing the tread to a predetermined radius and controlling the angle at which the shoulders are buffed and the extent of the buffing.

The chart includes the periphery size of the finished tire if the operation has been carried out correctly. This measurement is made by measuring completely around the tire at any diameter.

What I claim is:

The method of preparing a tire for retreading which comprises buffing the tread to a predetermined radius while revolving the tire, and applying a template to the buffed tread and shoulder surfaces from time to time during the buffing as a guide and limiting the subsequent buffing as thereby indicated and checking the width and location of the tread by a right-angled tread-squaring tool one edge of which is pressed vertically against the sidewall of a tire with an arm at a right angle thereto above the tire, and locating markers on the arm to mark the edges of the buffed tread with the tire in one position, then rotating the tire, and buffing the tire surfaces on the outside of the markers to form the shoulders of the tire, thereby centering the tread.

References Cited in the file of this patent

UNITED STATES PATENTS

| Number | Name | Date |
|---|---|---|
| 344,083 | Cullen et al. | June 22, 1886 |
| 781,960 | Marbach | Feb. 7, 1905 |
| 840,331 | Holzermann | Jan. 1, 1907 |
| 1,637,775 | Keaton | Aug. 2, 1927 |
| 1,671,343 | Carroll | May 29, 1928 |
| 2,294,047 | Pollock | Aug. 25, 1942 |
| 2,317,925 | Lewis | Apr. 27, 1943 |
| 2,364,384 | Oakes | Dec. 5, 1944 |
| 2,369,960 | Gage | Feb. 20, 1945 |
| 2,392,667 | Hawkinson | Jan. 8, 1946 |
| 2,537,616 | Avenia | Jan. 9, 1951 |
| 2,636,277 | Hawkinson | Apr. 28, 1953 |

FOREIGN PATENTS

| Number | Country | Date |
|---|---|---|
| 281,996 | Great Britain | July 12, 1928 |